(12) United States Patent
Shin et al.

(10) Patent No.: US 11,063,488 B2
(45) Date of Patent: Jul. 13, 2021

(54) STATOR FOR ELECTRIC ROTATING MACHINE

(71) Applicant: LG Electronics Inc., Seoul (KR)

(72) Inventors: Hojun Shin, Seoul (KR); Kyeonghwan Kim, Seoul (KR); Gyeongjae Park, Seoul (KR); Wonjung Sung, Seoul (KR); Yangsoo Lee, Seoul (KR); Junghyun Park, Seoul (KR); Junho Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 141 days.

(21) Appl. No.: 16/539,069

(22) Filed: Aug. 13, 2019

(65) Prior Publication Data

US 2020/0220408 A1    Jul. 9, 2020

(30) Foreign Application Priority Data

Jan. 7, 2019    (KR) .......................... 10-2019-0001832

(51) Int. Cl.
*H02K 3/40*    (2006.01)
*H02K 1/16*    (2006.01)
(Continued)

(52) U.S. Cl.
CPC ................ *H02K 3/40* (2013.01); *H02K 1/16* (2013.01); *H02K 3/12* (2013.01); *H02K 3/28* (2013.01); *H02K 3/34* (2013.01)

(58) Field of Classification Search
CPC ............... H02K 3/40; H02K 1/16; H02K 3/12
See application file for complete search history.

(56) References Cited

U.S. PATENT DOCUMENTS

| 1,822,261 A * | 9/1931 | Apple ...................... H02K 3/12 |
| | | 310/201 |
| 5,097,167 A * | 3/1992 | Kanayama ............... H02K 3/26 |
| | | 310/201 |

(Continued)

FOREIGN PATENT DOCUMENTS

| EP | 1903662 A1 * | 3/2008 | ............... H02K 3/40 |
| JP | 2014-003498 A | 1/2014 | |

(Continued)

OTHER PUBLICATIONS

European Search Report received from the European Patent Office (EPO) in European Patent Application No. 19189555.6, dated Jan. 22, 2020 (7 pages).

*Primary Examiner* — Robert W Horn
(74) *Attorney, Agent, or Firm* — Finnegan, Henderson, Farabow, Garrett & Dunner LLP

(57) ABSTRACT

The present disclosure relates to a stator for an electric rotating machine, the stator comprising a stator core comprising teeth and slots, and a stator coil comprising a plurality of hairpins configured to be inserted into the slots of the stator core in a predetermined pattern. Each of the plurality of hairpins comprises a conductor and a coating layer surrounding an outer surface of the conductor. The plurality of hairpins comprise a first hairpin configured to be placed in a first section of the stator coil predetermined from an end to which power is to be input, and a second hairpin placed in a section after the first section. The first hairpin provides better insulation performance than the second hairpin, and the first section has a higher voltage distribution ratio than the section including the second hairpin.

11 Claims, 8 Drawing Sheets

(51) Int. Cl.
  *H02K 3/12* (2006.01)
  *H02K 3/28* (2006.01)
  *H02K 3/34* (2006.01)

(56) References Cited

U.S. PATENT DOCUMENTS

| | | | | |
|---|---|---|---|---|
| 5,864,193 | A | 1/1999 | Katoh | |
| 6,291,918 | B1* | 9/2001 | Umeda | H02K 1/165 |
| | | | | 310/215 |
| 6,459,186 | B1* | 10/2002 | Umeda | H02K 1/165 |
| | | | | 310/208 |
| 6,873,082 | B2* | 3/2005 | Neet | H02K 1/165 |
| | | | | 310/215 |
| 6,894,415 | B2* | 5/2005 | Koike | H02K 3/12 |
| | | | | 310/180 |
| 7,038,346 | B2* | 5/2006 | Koike | H02K 3/12 |
| | | | | 310/184 |
| 7,193,348 | B2* | 3/2007 | Wada | H02K 1/16 |
| | | | | 310/180 |
| 7,327,063 | B2* | 2/2008 | Matsubara | H02K 3/02 |
| | | | | 310/184 |
| 7,564,159 | B2* | 7/2009 | Ooiwa | H02K 3/505 |
| | | | | 310/179 |
| 7,602,093 | B2* | 10/2009 | Oowatari | H02K 9/06 |
| | | | | 310/180 |
| 7,649,294 | B2* | 1/2010 | Koike | B23K 35/02 |
| | | | | 310/201 |
| 7,888,829 | B2* | 2/2011 | Koike | H02K 9/06 |
| | | | | 310/58 |
| 9,502,939 | B2* | 11/2016 | Kinpara | H02K 15/024 |
| 9,509,188 | B2* | 11/2016 | Kato | H02K 3/493 |
| 10,027,197 | B2* | 7/2018 | Mizutani | H02K 3/48 |
| 10,075,039 | B2* | 9/2018 | Ishizuka | H02K 3/04 |
| 10,298,084 | B2* | 5/2019 | Takahashi | H02K 3/42 |
| 10,366,805 | B2* | 7/2019 | Knerr | H02K 3/04 |
| 10,418,864 | B2* | 9/2019 | Inoue | H02K 1/146 |
| 10,510,459 | B2* | 12/2019 | Knerr | H02K 15/105 |
| 10,529,463 | B2* | 1/2020 | Yamoto | H02K 3/32 |
| 10,574,106 | B2* | 2/2020 | Takei | H02K 1/16 |
| 10,587,175 | B2* | 3/2020 | Maekawa | H02K 16/04 |
| 10,601,277 | B2* | 3/2020 | Ishii | H02K 15/0421 |
| 10,742,100 | B2* | 8/2020 | Lange | H02K 3/12 |
| 10,749,399 | B2* | 8/2020 | Riedl | H02K 3/12 |
| 10,796,814 | B2* | 10/2020 | Knerr | H02K 3/04 |
| 10,855,128 | B2* | 12/2020 | Lange | H02K 3/12 |
| 2004/0207284 | A1* | 10/2004 | Neet | H02K 1/165 |
| | | | | 310/215 |
| 2008/0231136 | A1* | 9/2008 | Obata | H02K 3/38 |
| | | | | 310/179 |
| 2011/0072641 | A1* | 3/2011 | Baumann | H02K 3/38 |
| | | | | 29/596 |
| 2019/0109523 | A1* | 4/2019 | Miyazaki | H02K 15/04 |
| 2019/0199184 | A1* | 6/2019 | Oshel | H02K 1/16 |
| 2019/0214869 | A1* | 7/2019 | Moon | H02K 1/16 |
| 2019/0222087 | A1* | 7/2019 | Matsumoto | H02K 15/064 |
| 2019/0280548 | A1* | 9/2019 | Takahashi | H02K 3/14 |
| 2019/0312477 | A1* | 10/2019 | Vaubel | H02K 3/24 |
| 2019/0334397 | A1* | 10/2019 | Kaji | H02K 3/14 |
| 2019/0372438 | A1* | 12/2019 | Takanezawa | H02K 15/0087 |
| 2020/0067362 | A1* | 2/2020 | Shiah | H02K 1/165 |
| 2020/0212750 | A1* | 7/2020 | Sheu | H02K 3/14 |
| 2020/0220408 | A1* | 7/2020 | Shin | H02K 3/34 |
| 2020/0220411 | A1* | 7/2020 | Kim | H02K 3/48 |
| 2020/0295612 | A1* | 9/2020 | Tanie | H02K 1/14 |
| 2020/0343796 | A1* | 10/2020 | Graef | H02K 15/0081 |
| 2020/0395804 | A1* | 12/2020 | Ahmed | H02K 1/16 |

FOREIGN PATENT DOCUMENTS

| | | |
|---|---|---|
| JP | 2014-204300 A | 10/2014 |
| KR | 10-2018-0057949 A | 5/2018 |

\* cited by examiner

STATOR FOR ELECTRIC ROTATING MACHINE

CROSS-REFERENCE TO RELATED APPLICATION

This application claims priority under 35 U.S.C. § 119 to Korean Patent Application No. 10-2019-0001832, filed on Jan. 7, 2019, the disclosure of which is hereby incorporated by reference in its entirety.

BACKGROUND

1. Technical Field

The present disclosure relates to a stator for an electric rotating machine.

2. Background

As is well known, an electric rotating machine refers to a machine having a stator and a rotor rotatably provided to the stator.

Some of the electric rotating machines are composed of a generator that converts mechanical energy into electrical energy, and others are composed of a motor that converts electrical energy into mechanical energy. Others of the electric rotating machines may be configured to selectively function as a motor or a generator.

The stator of the electric rotating machine has a stator core including slots and teeth and a stator coil wound via the slots.

The stator of the electric rotating machine having an increasing ratio of a cross-section of a conductor of the stator coil to an internal area of the slot (i.e., a fill factor) is advantageous for increasing output power.

In consideration of this point, a stator coil formed by connecting a conductor segment or a hairpin magnet wire (hereinafter referred to as "hairpin"), which is formed by bending a flat-type copper wire with a relatively large cross sectional area of a conductor in a "U" shape, in a predetermined pattern is used for some stators.

The hairpin has a conductor with a rectangular cross section and a coating layer (or film, or insulating film) formed of an insulating material surrounding an outer surface of the conductor.

The hairpin has a pair of insertion parts to be inserted into different slots of the stator core and a connection part for connecting ends of the insertion parts.

The pair of insertion parts of the hairpin is usually formed in a line spaced apart from each other at a predetermined distance (a slot pitch distance), and the connection part is bent in an substantially reverse "V" shape.

The pair of insertion parts of the hairpin is inserted into different slots of the stator cores, and is arranged apart from each other in the slot of the stator core along the radial direction to form layers.

However, in such a conventional stator of an electric rotating machine, the voltage applied to the stator coil increases as the voltage of an electric vehicle drive system increases. When a high voltage is applied, partial discharge due to a high-voltage surge may be generated. When the thickness of a coating layer of a hairpin is increased considering this characteristic, a space factor or a fill factor of a conductor with respect to a cross sectional area of a slot decreases, and thus the output power of the electric rotating machine is reduced.

In order to solve this problem, for some stators of an electric rotating machine, a method of entirely decreasing the thickness of a coating layer of a hairpin in order to increase a space factor of a conductor and partially increasing the thickness of the coating layer in only a crossing region of the hairpin, where a potential difference is generated between phases, in order to ensure insulation performance is well known.

However, in such a conventional stator of an electric rotating machine, partial discharge due to a high voltage surge may be generated in a region where the thickness of the coating layer is not increased.

Also, for some stators for an electric rotating machine, a method of coating an inner side and an outer side of a hairpin with different insulating materials, so that the stators can be durable to compressive and tensile forces acting differently on an outer side and an inner side of a bending part of the hairpin, is well known.

However, in such a conventional stator of an electric rotating machine, when the outer side and the inner side of the hairpin are coated with different insulating materials, it takes much time and cost to produce the hairpin. In addition, insulation performance of boundary regions of different insulating materials may be insufficient.

PRIOR ART DOCUMENTS

Patent Documents (Patent Document 1) JP2014-003498 A
(Patent Document 2) JP2014-204300 A

SUMMARY

Therefore, an aspect of the disclosure is to provide a stator for an electric rotating machine, the stator being capable of suppressing occurrence of partial discharge by ensuring insulation performance.

Another aspect of the disclosure provides a stator for an electric rotating machine, the stator being capable of enhancing output power by increasing a space factor of a conductor with respect to a slot.

Another aspect of the disclosure provides a stator for an electric rotating machine, the stator being capable of reducing production cost by suppressing use of an expensive insulating material.

Another aspect of the disclosure provides a stator for an electric rotating machine, the stator being capable of suppressing occurrence of magnetic flux saturation by increasing the width of teeth.

In order to accomplish the foregoing objectives, according to the present disclosure, there is provided a stator for an electric rotating machine, and the stator may include a stator core comprising teeth and slots; and a stator coil comprising a plurality of hairpins configured to be inserted into the slots of the stator core in a predetermined pattern, each of the plurality of hairpins comprising a conductor and a coating layer surrounding an outer surface of the conductor, wherein the plurality of hairpins comprise a first hairpin configured to be placed in a first section of the stator coil predetermined from an end to which power is to be input, and a second hairpin configured to be placed in a section after the first section.

According to an embodiment of the present disclosure, a coating layer of the first hairpin may be formed of a material with a lower specific inductive capacity than a material forming a coating layer of the second hairpin, and the first hairpin may provide better insulation performance than the second hairpin.

According to an embodiment of the present disclosure, a cross-sectional area of the conductor of the first hairpin may be formed to be the same as a cross-sectional area of a conductor of the second hairpin.

According to an embodiment of the present disclosure, a thickness of the coating layer of the first hairpin may be the same as a thickness of the coating layer of the second hairpin.

According to an embodiment of the present disclosure, a coating layer of the first hairpin may be thicker than a coating layer of the second hairpin, and the first hairpin may provide better insulation performance than the second hairpin.

According to an embodiment of the present disclosure, a cross-sectional area of a conductor of the first hairpin may be smaller than a cross-sectional area of a conductor of the second hairpin.

According to an embodiment of the present disclosure, a cross-sectional area of a conductor of the first hairpin may be the same as a cross-sectional area of a conductor of the second hairpin.

According to an embodiment of the present disclosure, a cross-sectional area of a conductor of the first hairpin may be larger than a cross-sectional area of a conductor of the second hairpin.

According to an embodiment of the present disclosure, at least one of the slots of the stator core may comprise an extension part comprising an extended width configured to accommodate the first hairpin.

According to an embodiment of the present disclosure, the extension part may be adjacent to an outer periphery of the stator along a radial direction of the stator core.

According to an embodiment of the present disclosure, the coating layer of the first hairpin may be formed of a material with the same specific inductive capacity as a material forming the coating layer of the second hairpin.

According to an embodiment of the present disclosure, the first hairpin may comprise the same width and thickness as the second hairpin.

According to an embodiment of the present disclosure, the stator coil may comprise first to n-th coil parts, each coil part being configured to include two or more hairpins of the plurality of hairpins.

According to an embodiment of the present disclosure, the stator coil may comprise first to n-th coil parts, each coil part being configured to include two or more hairpins of the plurality of hairpins, and the first coil part and a second coil part being connected to the first coil part may be respectively configured to include the first hairpin.

According to an embodiment of the present disclosure, the stator coil may comprise first to n-th coil parts, each coil part being configured to include two or more hairpins of the plurality of hairpins, and the first section may comprise the first coil part and may have a voltage distribution ratio of 60% or higher.

According to an embodiment of the present disclosure, the stator coil may comprise first to n-th coil parts, each coil part being configured to include two or more hairpins of the plurality of hairpins, and the first section may comprise the first coil part and a second coil part connected to the first coil part and may have a voltage distribution ratio of 50% or higher.

A stator for an electric rotating machine according to another embodiment of the present disclosure may include a stator core comprising teeth and slots, and a stator coil comprising a plurality of hairpins configured to be inserted into the slots in a predetermined pattern, each of the hairpins comprising a conductor and a film surrounding an outer surface of the conductor, wherein the plurality of hairpins comprise a first hairpin configured to be placed in a first section of the stator coil predetermined from an end to which power is to be input, and a second hairpin configured to be placed in a section after the first section, the first hairpin provides better insulation performance than the second hairpin, and a coating layer of the first hairpin is formed of a material with a lower specific inductive capacity than a material forming a coating layer of the second hairpin.

According to an embodiment of the present disclosure, a conductor of the first hairpin may have the same cross-sectional area as a conductor of the second hairpin.

A stator for an electric rotating machine according to another embodiment of the present disclosure may include a stator core comprising teeth and slots, and a stator coil comprising a plurality of hairpins configured to be inserted into the slots in a predetermined pattern, each of the plurality of hairpins comprising a conductor and a coating layer surrounding an outer surface of the conductor, wherein the plurality of hairpins comprise a first hairpin configured to be placed in a section of the stator coil predetermined from an end to which power is to be input, and a second hairpin configured to be placed in a section after the first section, the first hairpin provides better insulation performance than the second hairpin, and a coating layer of the first hairpin is thicker than a coating layer of the second hairpin.

According to an embodiment of the present disclosure, the coating layer of the first hairpin may be formed of a material with the same specific inductive capacity as a material forming the coating layer of the second hairpin.

As described above, according to an embodiment of the present disclosure, due to the stator coil having first hairpins arranged in a first section predetermined from an end to which power is to be input and second hairpins arranged after the first section, the first hairpins having better insulation performance than the second hairpins, it is possible to suppress occurrence of partial discharge by ensuring a power input side (i.e., the first section) having a relatively high possibility of occurrence of partial discharge due to a high voltage surge.

Also, due to the second hairpins with relatively lower insulation performance being arranged in a section having a relatively low possibility of occurrence of partial discharge due to a high voltage surge after the first section, the second hairpins having a coating layer with a relatively low thickness, it is possible to increase a space factor of a conductor and thus enhance output power of the electric rotating machine.

Also, due to the coating layers of the first hairpins of the first section, which has a relatively high possibility of occurrence of partial discharge due to a high voltage surge, being formed of an expensive insulating material with a lower specific inductive capacity than that of the coating layers of the second hairpins, it is possible to reduce use of an expensive insulating material with a low specific inductive capacity and thus to reduce production cost of the stator coil.

Also, due to the coating layers of the first hairpins of the first section, which has a relatively high possibility of occurrence of partial discharge due to a high voltage surge, being formed of an expensive insulating material with a lower specific inductive capacity than that of the coating layers of the second hairpins, it is not necessary to increase the thickness of the coating layers in order to ensure insulation performance. Thus, the size of the slot may be relatively reduced, and the width of the teeth is relatively increased. Accordingly, it is possible to suppress occurrence of magnetic flux saturation.

DETAILED DESCRIPTION

Figure 1:
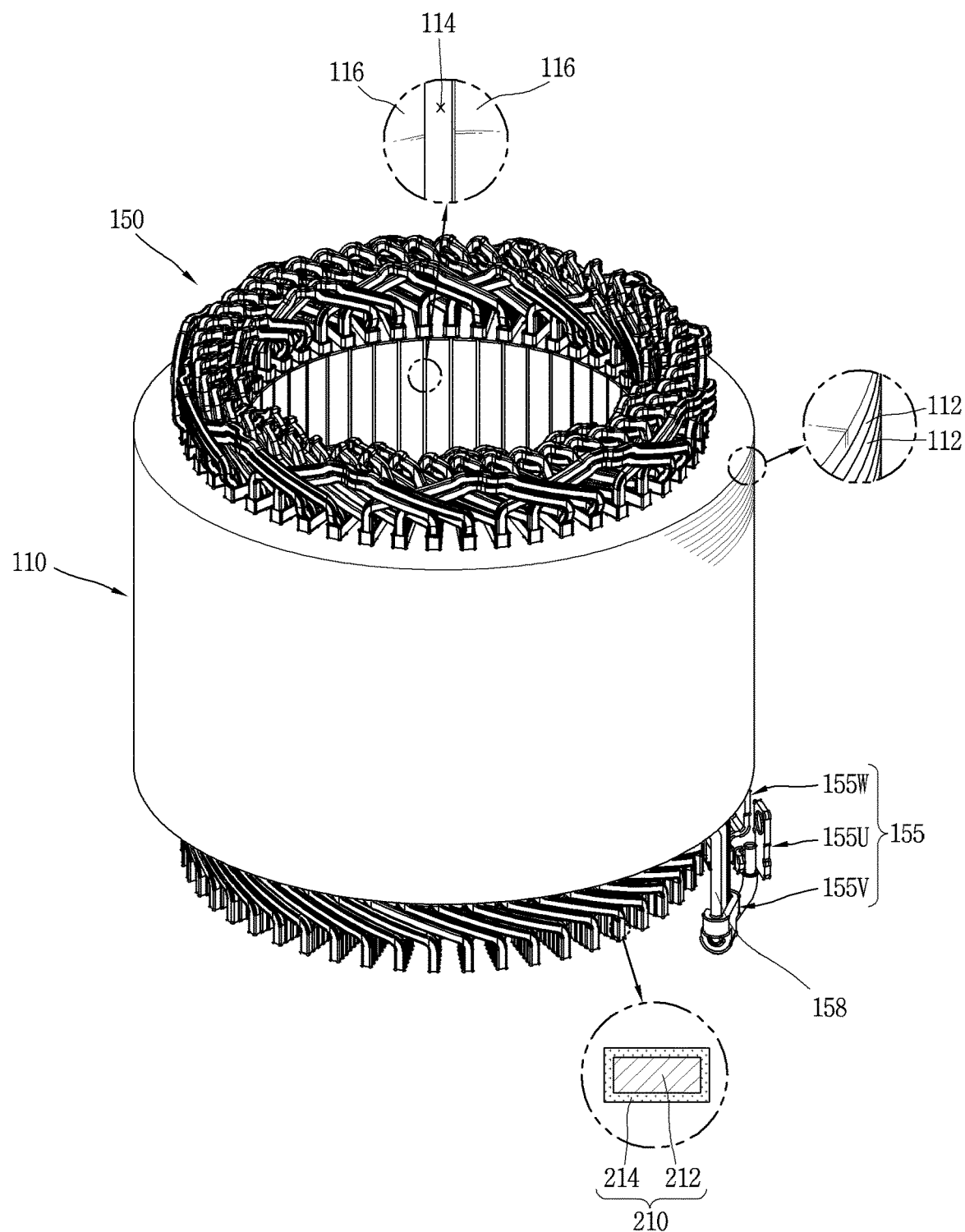
FIG. 1 is a perspective view of a stator of an electric rotating machine according to an embodiment of the present disclosure.

Hereinafter, embodiments of the present disclosure will be described in detail with reference to the accompanying drawings. Herein, like reference numerals denote like elements even in different embodiments, and a description for an element appearing first will replace descriptions for like elements appearing later. As used herein, the singular forms "a," "an," and "the" are intended to include the plural forms as well unless the context clearly indicates otherwise. In describing embodiments disclosed in the specification, moreover, the detailed description will be omitted when a specific description for publicly known technologies to which the present disclosure pertains is judged to obscure the gist of the embodiments disclosed in the specification. Also, it should be noted that the accompanying drawings are merely illustrated to easily understand the embodiments disclosed in the specification, and therefore, they should not be construed to limit the technical spirit disclosed in the specification.

Figure 2:
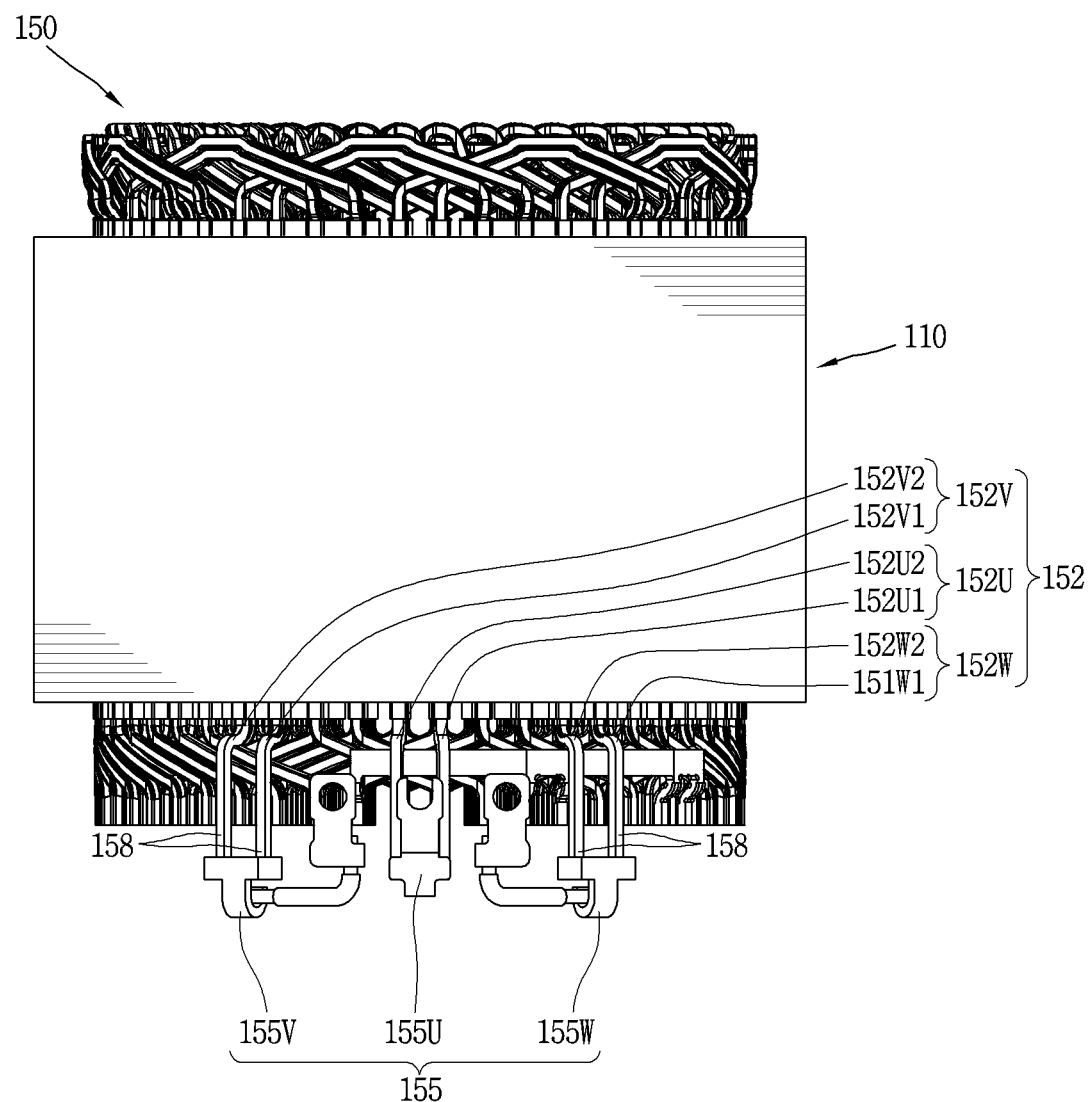
FIG. 2 is a front view of the stator of FIG. 1.
Figure 3:
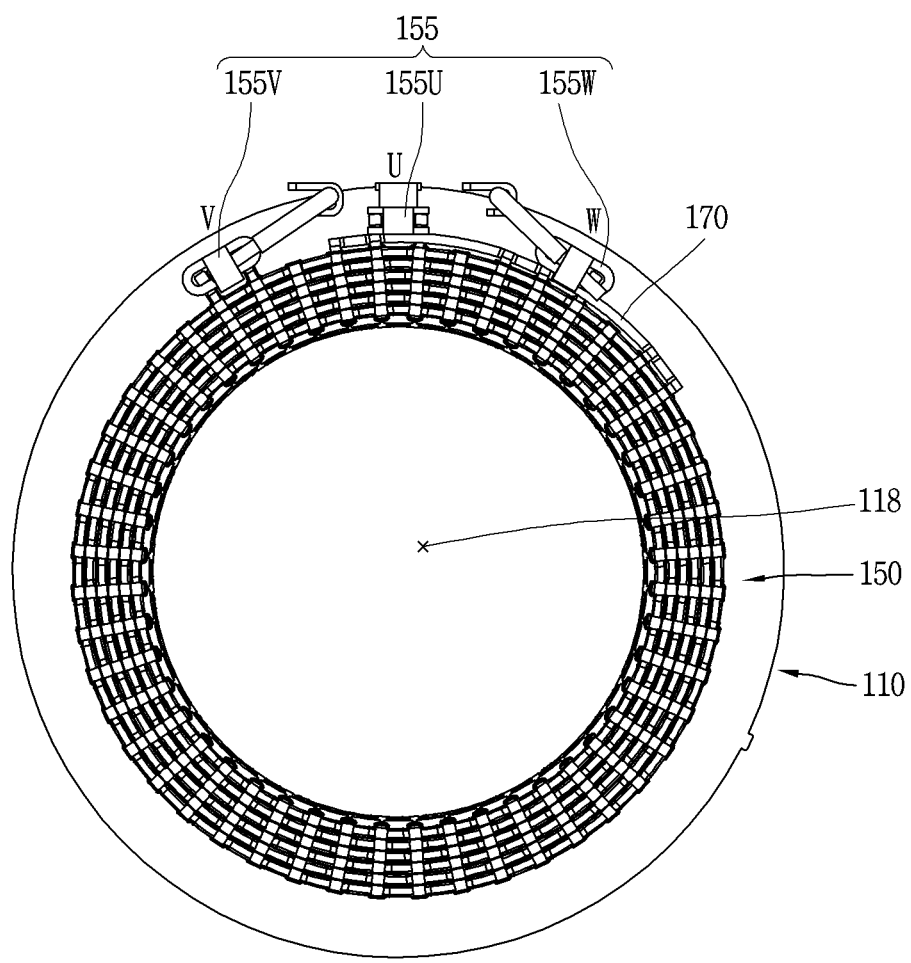
FIG. 3 is a bottom view of the stator of FIG. 2.

FIG. 1 is a perspective view of a stator of an electric rotating machine according to an embodiment of the present disclosure, FIG. 2 is a front view of the stator of FIG. 1, and FIG. 3 is a bottom view of the stator of FIG. 2. As shown in FIGS. 1 to 3, a stator of an electric rotating machine according to an embodiment has a stator core 110 and a stator coil 150.

The stator core 110 is composed of a plurality of slots 114 and a plurality of teeth 116. The stator core 110 has a rotor receiving hole 118 passing therethrough so that a rotor (not shown) may be rotatably received. The stator core 110 is formed by, for example, stacking and insulating electrical steel sheets in which the slots 114 and teeth 116 are formed against one another. The electrical steel sheets 112 are formed, for example, in a circular shape, and the rotor receiving hole 118 is formed to pass through the electrical steel sheets at the center thereof. The teeth 116, each of which has a tooth shape, are formed around the rotor receiving hole 118 at predetermined pitches, and the slots 114 are formed to pass between the teeth 116. The slots 114 and the teeth 116 are formed circumferentially and alternately.

The stator coil 150 has a plurality of hairpins 210 to be inserted into the slots 114. The stator coil 150 has a plurality of phase-specific coil parts 152 connected to phases of a power source. The plurality of phase-specific coil parts 152 has, for example, a U-phase coil part 152U connected to U-phase of the power source, a V-phase coil part 152V connected to V-phase of the power source, and a W-phase coil part 152W connected to W-phase of the power source. Each of the phase-specific coil parts 152 has, for example, a first phase-specific coil part and a second phase-specific coil part, which are connected in parallel. In detail, for example, the U-phase coil part 152U has a first U-specific coil part 152U1 and a second U-specific coil part 152U2, which are connected in parallel. The V-phase coil part 152V has a first V-phase coil part 152V1 and a second V-phase coil part 152V2, which are connected in parallel. The W-phase coil part 152W has a first W-phase coil part 152W1 and a second W-phase coil part 152W2 connected in parallel to each other.

Figure 4:
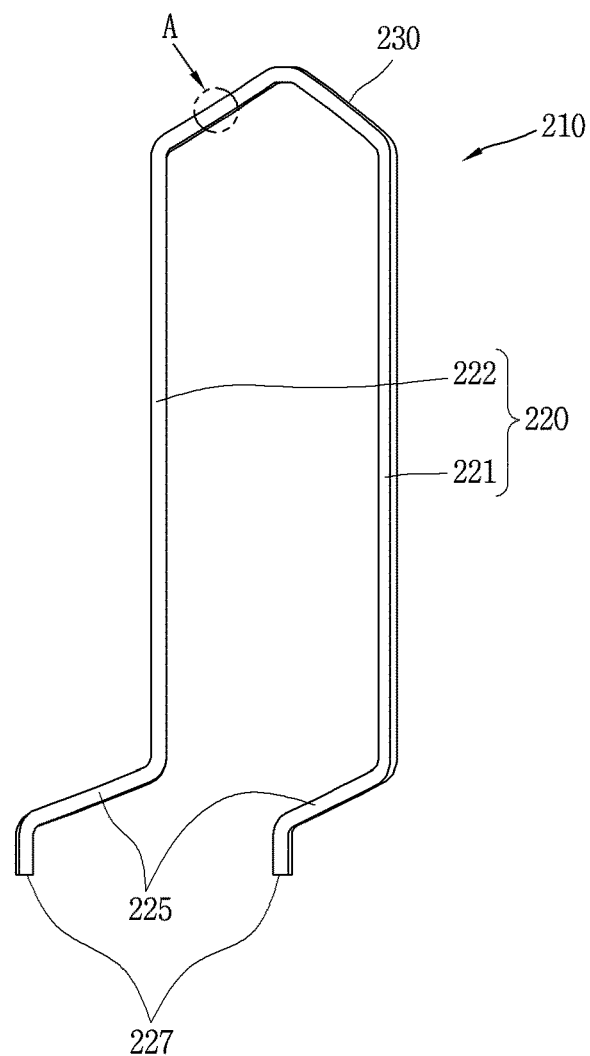
FIG. 4 is a perspective view of a hairpin of the stator of FIG. 1.
Figure 5:
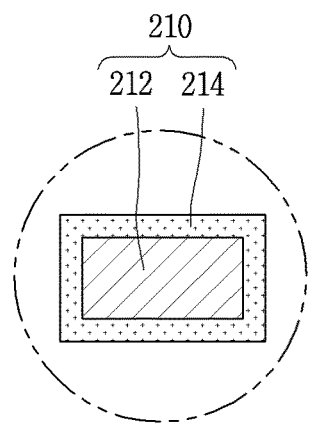
FIG. 5 is a cross-sectional view of the hairpin of FIG. 4.

FIG. 4 is a perspective view of a hairpin of the stator of FIG. 1, and FIG. 5 is a cross-sectional view of the hairpin of FIG. 4. As shown in FIGS. 4 and 5, a hairpin 210 is formed by bending a predetermined length of conductor in a substantially "U" shape. The hairpin 210 has an electrically conductive conductor 212 and a coating layer 214 formed of an insulating material surrounding the surface of the conductor 212.

The hairpin 210 has a pair of insertion parts 220 to be inserted into the slots 114 of the stator core 110 and a connection part 230 for connecting one ends of the insertion parts 220. The pair of insertion parts 220 have a first insertion part 221 and a second insertion part 222 placed in parallel and spaced a predetermined distance from each other. For example, the pair of insertion parts 220 may be spaced six slot pitches apart from each other. In detail, for example, when the first insertion part 221 is inserted into a first slot, the second insertion part 222 is inserted into a seventh slot, which is spaced six slot pitches apart from the first slot circumferentially with respect to the stator core 110.

The pair of insertion part 220 is formed to have a length greater than a stacking thickness of the stator core 110. In detail, the insertion parts 220 are inserted into the slots 114 at one end of the stator cores 110 and then protrude from the other end of the stator core 110. The remaining parts (regions) of the insertions parts protruding from the other end of the stator core 110 are bent obliquely and circumferentially with respect to the stator core 110 and then are conductively connected to another hairpin 210 according to a predetermined pattern. Each of the insertion parts 220 has an inclined extension part 225 that is bent obliquely and circumferentially with respect to the stator core 110 and a connection end 227 that is axially bent at one end of the inclined extension part 225 and is connected to another conductor 212.

Each of the phase-specific coil part 152 is composed of a plurality of hairpins 210. Power input parts 155 to be connected to an external power source (e.g., an inverter) are connected to one ends of the phase-specific coil parts 152. The power input part 155 has a U-phase power input part 155U connected to the first U-phase coil part 152U1 and the second U-phase coil part 152U2, a V-phase power input part 155V connected to the first V-phase coil part 152V1 and the second V-phase coil part 152V2, and a W-phase power input part 155W connected to the first W-phase coil part 152W1 and the second W-phase coil part 152W2. A connection wire 158 protrudes axially from one end of the stator core 110 and is connected to first hairpins 210 of the phase-specific coil parts 152. The power input part 155 is conductively connected to the connection wire 158.

Figure 6:
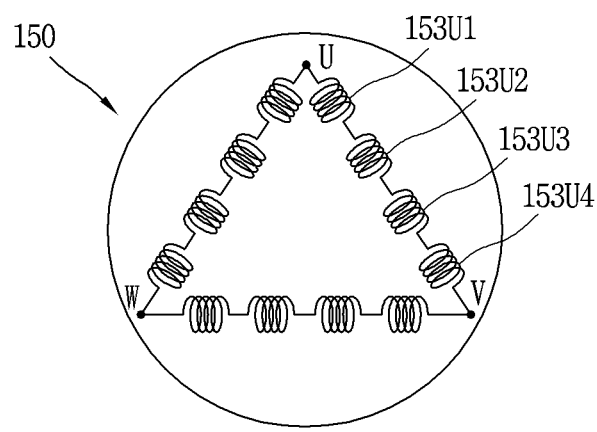
FIG. 6 is a schematic wiring diagram of a stator coil of FIG. 1.

FIG. 6 is a schematic wiring diagram of the stator coil of FIG. 1. As shown in FIG. 6, the phase-specific coil parts 152 (the U-phase coil part 152U, the V-phase coil part 152V, and the W-phase coil part 152W) may be connected, for example, in a so-called triangular connection or delta connection in which three power sources with the same magnitude and different phases, which are shifted 120 degrees apart, are connected in a triangular shape. For example, the stator coil 150 may be started by a delta connection and may be operated by a wye connection.

Figure 7:
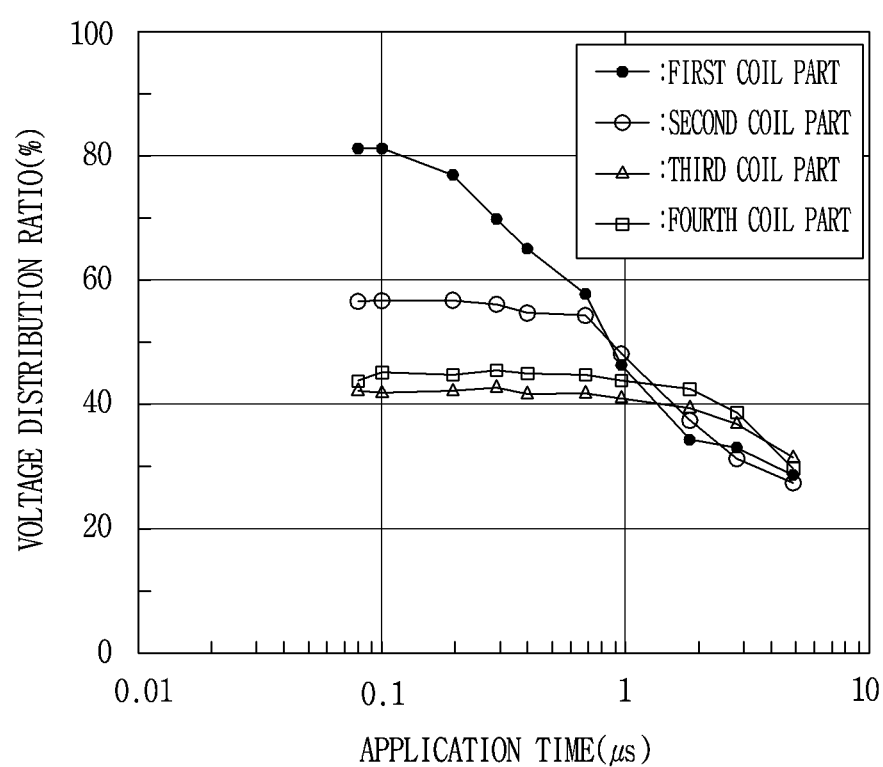
FIG. 7 is a diagram showing a voltage-sharing ratio of each coil part of FIG. 6.

FIG. 7 is a diagram showing a voltage distribution ratio of each coil part of FIG. 6. As shown in FIG. 7, the stator coil 150 has a plurality of phase-specific coil parts 152, and each of the phase-specific coil parts 152 has a plurality of partial coil part connected to one another. When the U-phase coil part 152U is described as an example, the partial coil parts may have a first coil part 153U1, a second coil part 153U2, a third coil part 153U3, and a fourth coil part 153U4. The first coil part 153U1, the second coil part 153U2, the third coil part 153U3, and the fourth coil part 153U4 may each have a predetermined number of hairpins 210. When power is applied to the stator coil 150, different distribution voltages are applied to the first coil part 153U1, the second coil part 153U2, the third coil part 153U3, and the fourth coil part 153U4.

In detail, when a change in input voltage with time is detected through an oscilloscope upon application of power to the stator coil 150, it can be seen that the first coil part 153U1 connected to the power input parts 155 of the phase-specific coil parts 152 has the highest voltage distribution ratio, which is more than or equal to 60%, the second coil part 153U1 connected to the first coil part 153U1 has a voltage distribution ratio of 50% or higher and less than 60%, and the third coil part 153U3 connected to the second coil part 153U2 and the fourth coil part 153U4 connected to the third coil part 153U3 have voltage distribution ratios of approximately 40% or higher and less than 50%.

The stator coil 150 of the electric rotating machine according to an embodiment of the present disclosure includes first hairpins 210*a* placed in a first section 160*a* predetermined from an end to which power is to be input and second hairpins 210*b* placed in a second section 160*b* after the first section 160*a*.

Here, the first hairpins 210*a* have better insulation performance than the second hairpins 210*b*.

Figure 8:
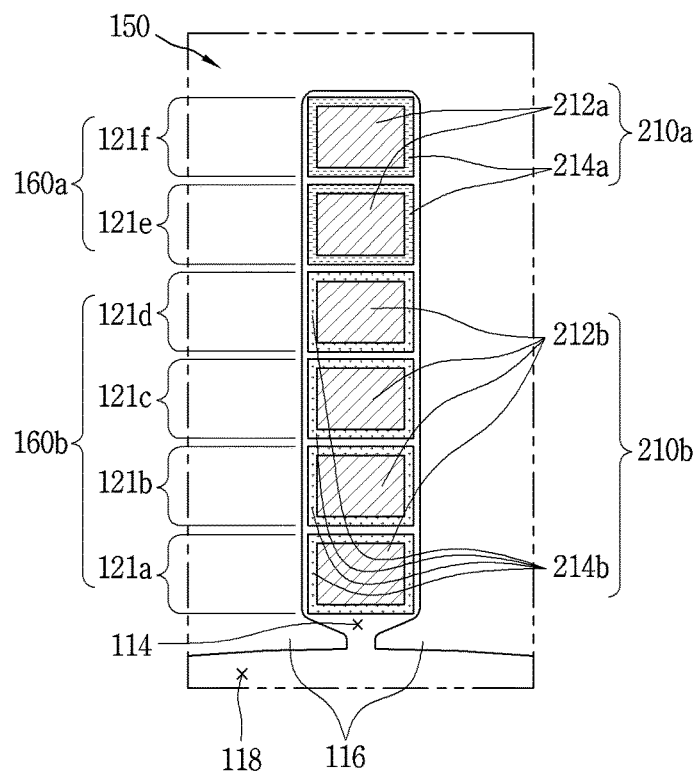
FIG. 8 is a diagram showing a state in which the hairpins of FIG. 1 are arranged in a slot.

FIG. 8 is a diagram showing a state in which the hairpins of FIG. 1 are arranged in a slot. As shown in FIG. 8, a plurality of hairpins (insertion parts) are inserted into the slot 114 of the stator core 110 and are radially spaced apart from one another. The hairpins 210 inside the slot 114 are placed in a first layer 121*a* at the innermost side radially with respect to the stator core 110, second to fifth layers 121*b* to 121 outside the first layer 121*a*, and a sixth layer 121*f* outside the fifth layer 121*e*.

The stator coil 150 of this embodiment includes the first hairpins 210*a* placed in the first section 160*a* determined from the end to which power is to be input and the second hairpins 210*b* placed in the second section 160*b* after the first section 160*a*.

The first hairpins 210*a* may be provided in the sixth layer 121*f* and the fifth layer 121*e* of the slot 114. The sixth layer 121*f* and the fifth layer 121*e* of the slot 114 form the first section 160*a*. The second hairpins 210*b* may be provided in the fourth layer 121*d*, the third layer 121*c*, the second layer 121*b*, and the first layer 121*a*. The first layer 121*a*, the second layer 121*b*, the third layer 121*c*, and the fourth layer 121*d* form the second section 160*b*.

Each of the first hairpins 210*a* has a first conductor 212*a* that is electrically conductive and a first coating layer 214*a* that is formed to surround an outer surface of the first conductor 212*a*.

Each of the second hairpins 210*b* has a second conductor 212*b* that is electrically conductive and a second coating layer 214*b* that is formed to surround an outer surface of the second conductor 212*b*.

The first conductors 212*a* of the first hairpins 210*a* and the second conductors 212*b* of the second hairpins 210*b* are formed to have the same cross-sectional area. The first conductors 212*a* and the second conductors 212*b* have the same width and thickness.

The first coating layers 214*a* of the first hairpins 210*a* are formed of an insulating material with a lower specific inductive capacity than that of the second coating layers 214*b* of the second hairpins 210*b*. Thus, the first hairpins 210*a* may have better insulation performance than the second hairpins 210*b*.

In detail, for example, the first coating layers 214*a* may be formed of a material with a specific inductive capacity of 3 to 3.4. For example, the first coating layers 214*a* may be formed of polyimide (PI) or polyether ether ketone (PEEK).

The second coating layers 214*b* may be formed of a material with a specific inductive capacity of 4.1 or more. For example, the second coating layers 214*b* may be formed of polyamideimide (PAI).

The first coating layers 214*a* may have the same thickness as the second coating layers 214*b*. Thus, the first hairpins 210*a* and the second hairpins 210*b* may have the same cross-sectional area. According to such a configuration, the first hairpins 210*a* and the second hairpins 210*b* may be simultaneously inserted into a slot 114 with the same inner width. Therefore, the cross-sectional area of the first hairpins 210*a* does not increase while the insulation performance of the first section 160*a* is ensured, and thus it is possible to keep the size of the slot 114 the same as before. Also, since the width of the teeth 116 does not decrease, it is possible to suppress occurrence of magnetic flux saturation due to the decrease in width of the teeth 116.

A first coil part and a second coil part, which have a relatively high voltage distribution ratio, among the plurality of coil parts of the stator coil 150 form the first section 160*a* composed of the first hairpins 210*a* with relatively good insulating characteristics. Here, the voltage distribution ratio of the first coil part and the second coil part (i.e., the first section 160*a*) where the first hairpins 210*a* are used may be set to, for example, 50% or higher.

Also, a third coil part and a fourth coil part, which have a relatively low voltage distribution ratio, among the plurality of coil parts of the stator coil 150 may be the second section 160*b* composed of the second hairpins 210*b*. Here, the voltage distribution ratio of the third coil part and the fourth coil part (i.e., the second section 160*b*) may be set to, for example, less than 50%.

Thus, by the first section 160a (the first coil part and the second coil part) with a relatively high voltage distribution ratio being composed of the first hairpins 210a and the second section 160b (the third coil part and the fourth coil part) with a relatively low voltage distribution ratio being composed of the second hairpins 210b, it is possible to reduce the possibility of partial discharge due to a high voltage surge and also significantly reduce production cost of the hairpins.

According to such a configuration, when a rotor (not shown) is placed inside the stator core 110 and power is applied to the stator coil 150, the rotor may be rotated by the stator. In this case, by including first hairpins 210a with relatively good insulation performance in the first section 160a predetermined from the end to which power is to be input, it is possible to significantly reduce the possibility of partial discharge due to a high voltage surge.

Figure 9:
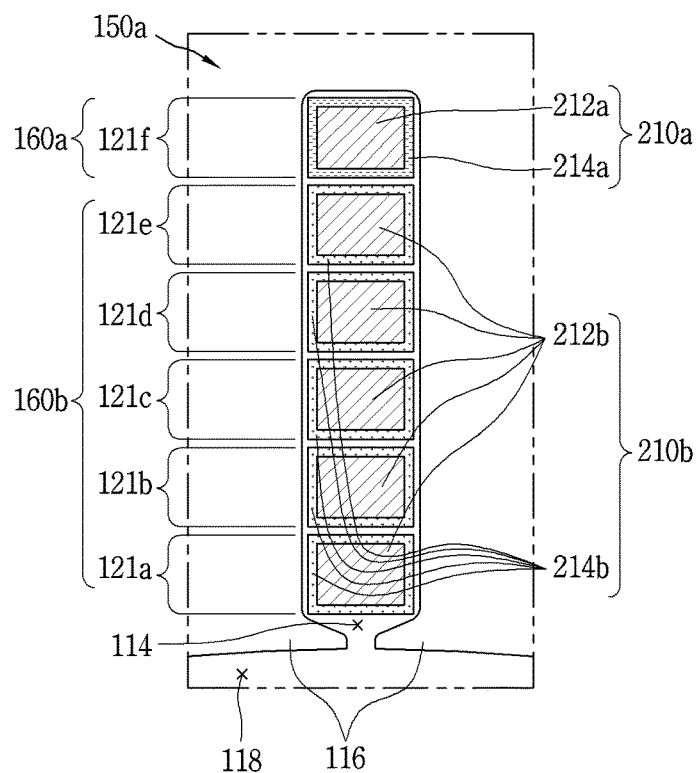
FIG. 9 shows a modification of a stator coil of FIG. 8.

FIG. 9 is a modification of FIG. 8. As shown in FIG. 9, a stator coil 150a of this embodiment includes first hairpins 210a placed in a first section 160a predetermined from the end to which power is to be input and second hairpins 210b placed in a second section 160b after the first section 160a.

The sixth layer 121f in the slot 114 of the stator core 110 forms the first section 160a including the first hairpins 210a. The first layer 121a, the second layer 121b, the third layer 121c, the fourth layer 121d, and the fifth layer 121e in the slot 114 form the second section 160b having the second hairpins 210b. Here, the voltage distribution ratio of the first section 160a may be set to 60% or higher.

Thus, by the first section 160a with a relatively high voltage distribution ratio being composed of the first hairpins 210a, which are relatively expensive, and the second section 160b with a relatively low voltage distribution ratio being composed of the second hairpins 210b, which are relatively cheap, it is possible to significantly reduce the possibility of partial discharge due to a high voltage surge and also significantly reduce production cost of the stator coil (hairpins).

In the foregoing and illustrated embodiments, the first section 160a in which the first hairpins 210a are arranged is set to the fifth layer 121e and the sixth layer 121f of the slot 114 of the stator core 110 or to the sixth layer 121f of the slot 114 as an example, but this is merely an example, and the present disclosure is not limited thereto. The first section 160a having the first hairpins 210a may be determined using the number of hairpins. In some slots 114, the first hairpins 210a are provided in the fifth layer 121e and the sixth layer 121f circumferentially with respect to the slots 114 of the stator core 110. In other slots 114, the hairpins may be provided in the sixth layer 121f.

Figure 10:
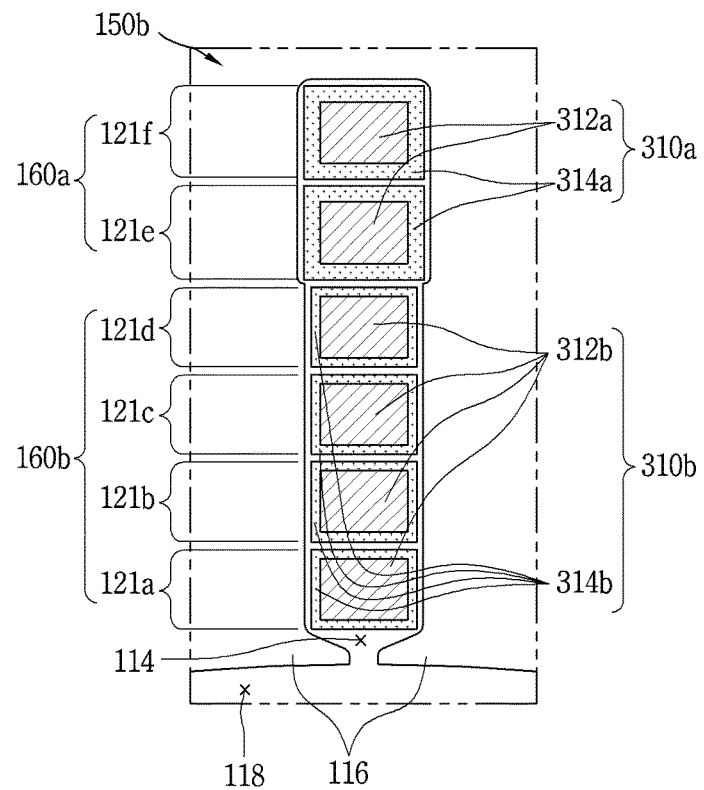
FIG. 10 is a diagram showing a state in which hairpins of a stator of an electric rotating machine are arranged in a slot according to another embodiment.

FIG. 10 is a diagram showing a state in which hairs of a stator of an electric rotating machine are arranged in a slot according to another embodiment. As shown in FIG. 10, a stator coil 150b of a stator of an electric rotating machine of this embodiment includes first hairpins 310a placed in a first section 160a predetermined from the end to which power is to be input and second hairpins 310b placed in a section after the first section 160a.

The sixth layer 121f and the fifth layer 121e in the slot 114 of the stator core 110 form the first section 160a including the first hairpins 310a. The fourth layer 121d, the third layer 121c, the second layer 121b, and the first layer 121a in the slot 114 form the second section 160b including the second hairpins 310b.

Each of the first hairpins 310a has a first conductor 312a and a first coating layer 314a formed to surround an outer surface of the first conductor 312a. For example, the first hairpins 310a may be provided in the sixth layer 121f and the fifth layer 121e in the slot 114 of the stator core 110. The sixth layer 121f and the fifth layer 121e of the slot 114 form the first section 160a.

Each of the second hairpins 310b has a second conductor 312b and a second coating layer 314b formed to surround an outer surface of the second conductor 312b. The second hairpins 310b may be provided in the first layer 121a, the second layer 121b, the third layer 121c, and the fourth layer 121d of the slot 114. The first layer 121a, the second layer 121b, the third layer 121c, and the fourth layer 121d of the slot 114 form the second section 160b.

The first conductors 312a and the second conductors 312b may have the same cross-sectional area. The first conductors 312a may have the same width and thickness as the second conductors 312b.

The thickness of the first coating layers 314a may be greater than the thickness of the second coating layers 314b. Thus, the first hairpins 310a may have better insulation performance than the second hairpins 310b. The first coating layers 314a and the second coating layers 314b may be formed of an insulating material with the same specific inductive capacity. The first coating layers 314a and the second coating layers 314b may have a specific inductive capacity of 4.1 or more. The first coating layers 314a and the second coating layers 314b may be implemented with the above PAI. Thus, by using a relatively cheap insulating material to form the coating layers of the first hairpins 310a and the second hairpins 310b, it is possible to significantly reduce production cost of the hairpins. Also, the insulation performance of the first section 160a, which has a high voltage distribution ratio, may be ensured, and thus it is possible to significantly reduce the possibility of partial discharge due to a high voltage surge. Here, the voltage distribution ratio of the first section 160a may be set to 50% or higher.

The first hairpins 310a have a greater cross sectional area than the second hairpins 310b. The first hairpins 310a have a greater width and thickness than the second hairpins 310b. An extension part 115, which extends so that the first hairpins 310a can be inserted thereto, is provided in the slot 114 of the stator core 110.

Figure 11:
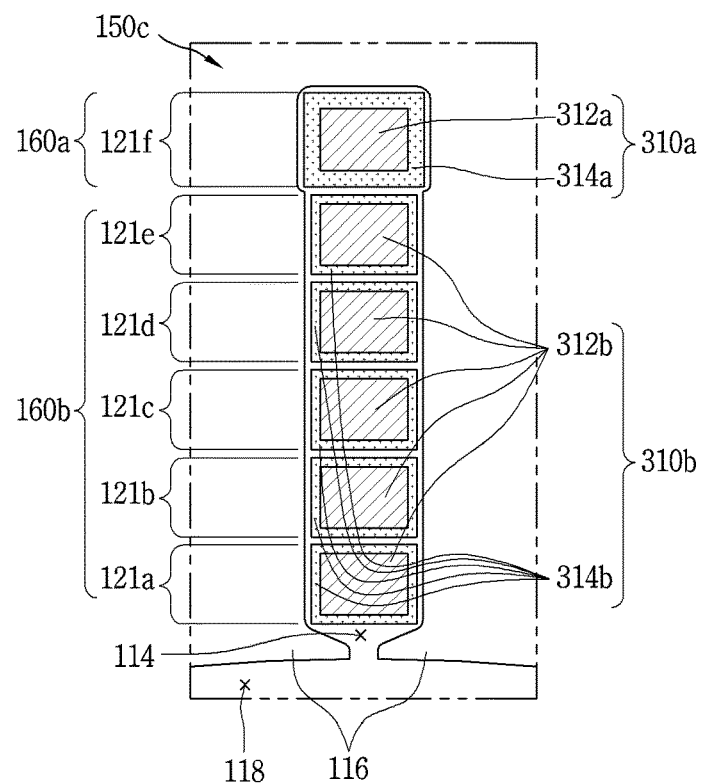
FIG. 11 shows a modification of a stator coil of FIG. 10.

FIG. 11 shows a modification of the stator coil of FIG. 10. As shown in FIG. 11, a stator coil 150c of a stator of an electric rotating machine of this embodiment includes first hairpins 310a placed in a first section 160a predetermined from the end to which power is to be input and second hairpins 310b placed in a section after the first section 160a.

The sixth layer 121f in the slot 114 forms the first section 160a having the first hairpins 310a. The first layer 121a, the second layer 121b, the third layer 121c, the fourth layer 121d, and the fifth layer 121e form the second section 160b including the second hairpins 310b.

An extension part 115, which extends so that the first hairpins 310a with a relatively greater cross-sectional area can be received, may be provided in the slot 114.

The first coating layers 314a and the second coating layers 314b may be implemented to have a specific inductive capacity of 4.1 or more, as described above. The first coating layers 314a and the second coating layers 314b may be implemented with the above PAI. Thus, by forming the first coating layers 314a and the second coating layers 314b using a relatively cheap insulating material, it is possible to significantly reduce production cost of the stator coil 150 while ensuring the insulation property of the stator coil 150.

Meanwhile, the voltage distribution ratio of the first section 160a, which has a relatively large voltage distribution ratio, may be set to 60%.

Figure 12:
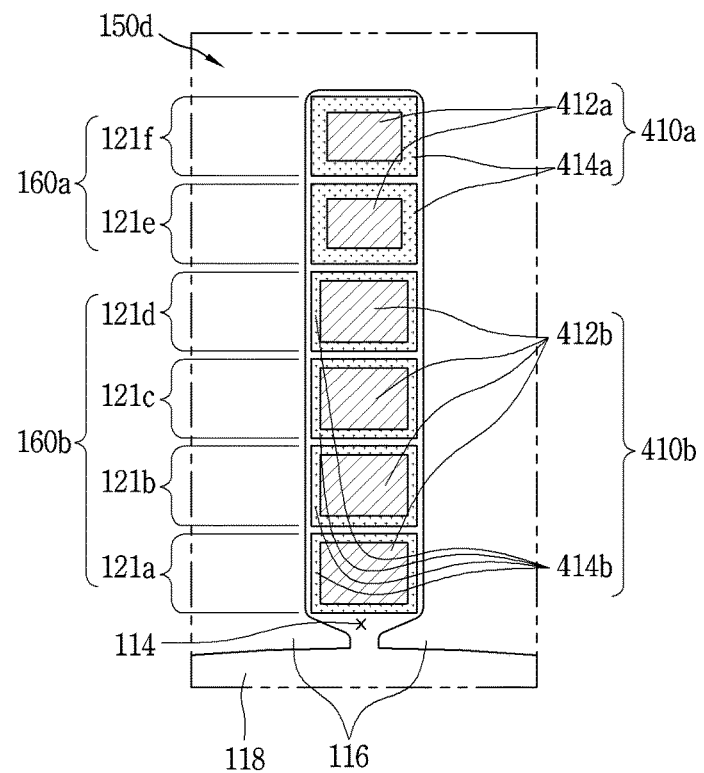
FIG. 12 is a diagram showing a state in which hairpins of a stator of an electric rotating machine are arranged in a slot according to another embodiment of the present disclosure.

FIG. 12 is a diagram showing a state in which hairpins of a stator of an electric rotating machine are arranged in a slot according to still another embodiment. A stator coil 150d of a stator of an electric rotating machine of this embodiment includes first hairpins 410a placed in a first section 160a predetermined from the end to which power is to be input and second hairpins 410b placed in a section after the first section 160a.

As shown in FIG. 12, the sixth layer 121f and the fifth layer 121e in the slot 114 form the first section 160a including the first hairpins 410a. The fourth layer 121d, the third layer 121c, the second layer 121b, and the first layer 121a form the second section 160b including the second hairpins 310b.

Each of the first hairpins 410a has a first conductor 412a and a first coating layer 414a formed to surround an outer surface of the first conductor 412a.

Each of the second hairpins 310b has a second conductor 412b and a second coating layer 414b formed to surround an outer surface of the second conductor 412b.

The first hairpins 410a have better insulation performance than the second hairpins 410b. The first conductors 412a have a smaller cross-sectional area than the second conductors 412b. The first conductors 412a have a smaller width and thickness than the second conductors 412b.

The first coating layers 414a and the second coating layers 414b may be formed of an insulating material with the same specific inductive capacity. The first coating layers 414a and the second coating layers 414b may have a specific inductive capacity of 4.1 or more. The first coating layers 414a and the second coating layers 314b may be formed of the above PAI. The first coating layers 414a are thicker than the second coating layers 414b. Thus, the first hairpins 410a have better insulation performance than the second hairpins 410b. According to such a configuration, by arranging the first hairpins 410a with relatively good insulation performance in the first section 160a with a relatively high voltage distribution ratio and arranging the second hairpins 410b in the second section 160b with a relatively lower voltage distribution ratio, it is possible to reduce the possibility of partial discharge while ensuring insulation performance of the first section 160a and also to significantly reduce production cost of the stator coil 150.

Here, the voltage distribution ratio of the first section 160a including the sixth layer 121f and the fifth layer 121e, where the first conductors 412a are placed, may be set to, for example, 50% or higher.

Figure 13:
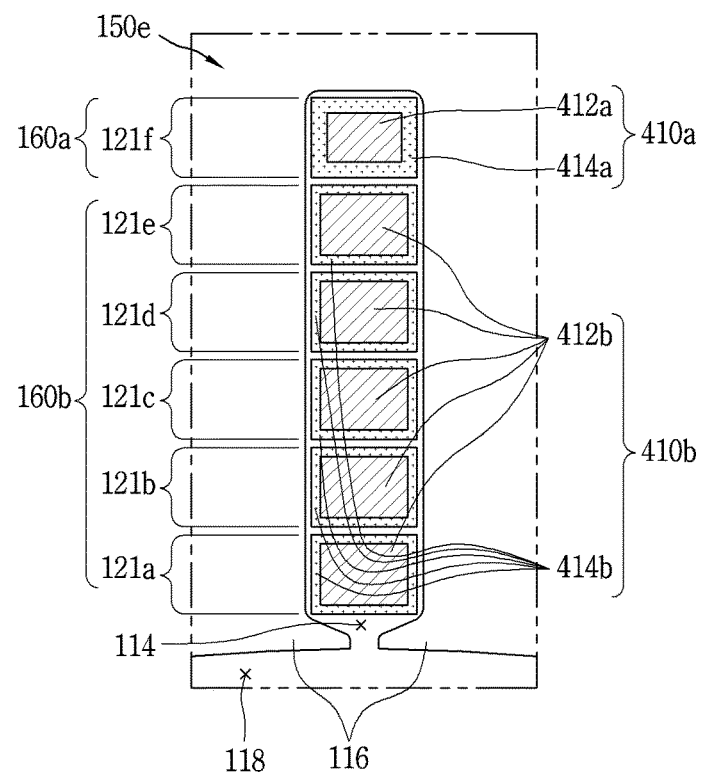
FIG. 13 shows a modification of a stator coil of FIG. 12.

FIG. 13 shows a modification of the stator coil of FIG. 12. As shown in FIG. 13, a stator coil 150e of a stator of an electric rotating machine of this embodiment includes first hairpins 410a placed in the first section 160a predetermined from the end to which power is to be input and second hairpins 410b placed in a section after the first section 160a.

The sixth layer 121f in the slot 114 forms the first section 160a having the first hairpins 410a. The first layer 121a, the second layer 121b, the third layer 121c, the fourth layer 121d, and the fifth layer 121e in the slot 114 form the second section 160b having the second hairpins 410b.

The voltage distribution ratio of the first section 160a having the first hairpins 410a may be set to, for example, 60%.

According to such a configuration, by arranging the first hairpins 410a with relatively good insulation performance in the first section 160a with a relatively high voltage distribution ratio and arranging the second hairpins 410b in the second section 160b with a relatively lower voltage distribution ratio, it is possible to suppress the possibility of partial discharge by ensuring insulation performance of the first section 160a and also to significantly reduce the entire production cost of the stator coil 150.

In the foregoing, exemplary embodiments of the present disclosure have been shown and described. However, the present disclosure may be embodied in various forms without departing from the spirit or essential characteristics thereof, and accordingly, it is intended that the embodiment described above not be limited by the detailed description provided herein.

Moreover, even if any embodiment is not specifically disclosed in the foregoing detailed description, it should be broadly construed within the scope of the technical spirit, as defined in the accompanying claims. Furthermore, all modifications and variations included within the technical scope of the claims and their equivalents should be covered by the accompanying claims.

What is claimed is:

1. A stator for an electric rotating machine, the stator comprising:
   a stator core comprising teeth and slots; and
   a stator coil comprising a plurality of hairpins configured to be inserted into the slots of the stator core in a predetermined pattern, each of the plurality of hairpins comprising a conductor and a coating layer surrounding an outer surface of the conductor,
   wherein the plurality of hairpins comprise a first hairpin configured to be placed in a first section of the stator coil predetermined from an end to which power is to be input, and a second hairpin configured to be placed in a section after the first section,
   wherein a coating layer of the first hairpin is thicker than a coating layer of the second hairpin, and the first hairpin provides better insulation performance than the second hairpin, and
   wherein a cross-sectional area of a conductor of the first hairpin is the same as a cross-sectional area of a conductor of the second hairpin.

2. The stator of claim 1, wherein a coating layer of the first hairpin is formed of a material with a lower specific inductive capacity than a material forming a coating layer of the second hairpin, and the first hairpin provides better insulation performance than the second hairpin.

3. The stator of claim 1, wherein at least one of the slots of the stator core comprises an extension part comprising an extended width configured to accommodate the first hairpin.

4. The stator of claim 3, wherein the extension part is adjacent to an outer periphery of the stator along a radial direction of the stator core.

5. The stator of claim 1, wherein the coating layer of the first hairpin is formed of a material with the same specific inductive capacity as a material forming the coating layer of the second hairpin.

6. The stator of claim 1, wherein:
   the stator coil comprises first to n-th coil parts,
   each coil part is configured to include two or more hairpins of the plurality of hairpins, and
   the first coil part is configured to include the first hairpin.

7. The stator of claim 1, wherein:
   the stator coil comprises first to n-th coil parts,
   each coil part is configured to include two or more hairpins of the plurality of hairpins, and the first coil part and a second coil part connected to the first coil part are respectively configured to include the first hairpin.

8. The stator of claim 1, wherein:
the stator coil comprises first to n-th coil parts,
each coil part is configured to include two or more hairpins of the plurality of hairpins, and
the first section comprises the first coil part and has a voltage distribution ratio of 60% or higher.

9. The stator of claim 1, wherein:
the stator coil comprises first to n-th coil parts,
each coil part is configured to include two or more hairpins of the plurality of hairpins, and
the first section comprises the first coil part and a second coil part connected to the first coil part, and has a voltage distribution ratio of 50% or higher.

10. A stator for an electric rotating machine, the stator comprising:
a stator core comprising teeth and slots; and
a stator coil comprising a plurality of hairpins configured to be inserted into the slots in a predetermined pattern, each of the plurality of hairpins comprising a conductor and a coating layer surrounding an outer surface of the conductor,
wherein
the plurality of hairpins comprise a first hairpin configured to be placed in a section of the stator coil predetermined from an end to which power is to be input, and a second hairpin configured to be placed in a section after the first section,
the first hairpin provides better insulation performance than the second hairpin,
a coating layer of the first hairpin is thicker than a coating layer of the second hairpin, and
a cross-sectional area of a conductor of the first hairpin is the same as a cross-sectional area of a conductor of the second hairpin.

11. The stator of claim 10, wherein the coating layer of the first hairpin is formed of a material with the same specific inductive capacity as a material forming the coating layer of the second hairpin.

* * * * *